UNITED STATES PATENT OFFICE.

STEPHEN BROADBENT, SR., OF BALTIMORE, MARYLAND.

COMPOSITION FOR LUBRICATING PURPOSES.

SPECIFICATION forming part of Letters Patent No. 245,698, dated August 16, 1881.

Application filed June 24, 1881. (Specimens.)

*To all whom it may concern:*

Be it known that I, STEPHEN BROADBENT, Sr., a citizen of the United States, residing in the city of Baltimore, State of Maryland, have invented a new and useful composition of matter consisting of cold water, carbonate of magnesia, nitrate of baryta, refined borax, and epsom-salts, to be used for lubricating purposes, and then mingling the same with an equal quantity of animal or vegetable or mineral oils for the use of all consumers using steam-power, of which the following is a specification.

My composition, both for the animal and vegetable oils, consists of the following ingredients, combined in the proportions stated, viz: cold water, forty gallons; carbonate of magnesia, pulverized, thirty ounces; nitrate of baryta, pulverized, thirty ounces; refined borax, thirty ounces.

My composition for the mineral oils consists in the following ingredients, combined in the proportions stated, viz: cold water, forty gallons; carbonate of magnesia, pulverized, ten ounces; refined borax, twenty ounces; calcimine, pulverized, twenty ounces; Epsom salts, pulverized, ten ounces.

In using the above compositions, both for animal and vegetable oils, and for the mineral oils, those ingredients and water are to be thoroughly mingled by agitation and then forty gallons of animal or vegetable or mineral oils are to be put therewith, in accordance with the compositions above named for each, and thoroughly mingled by agitation, when the water and ingredients and oils are thoroughly incorporated and ready for use by consumers.

By the use of the compositions above stated for the animal or vegetable or mineral oils the compositions on use by consumers possess a great amount of cohesion and adhesive attraction, and do not rust metals, do not gum, have no grit, and keep metals cool. The ingredients will stand any climate and keep without deteriorating for any length of time, either in powder form or mingled with the water, and consumers can mix their oils therewith as required for use. The ingredients in powder form can be transmitted cheaply to any part of the United States, and consumers can mix the same with the oil and water, as stated herein, for use.

I am the sole inventor of these compositions of matter, as stated herein, for lubricating purposes for those who use steam-power, and of the proportions of the ingredients herein named, both for animal and vegetable and mineral oils, to the best of my knowledge and belief, and am not aware that the compositions of matter named herein for either animal, vegetable, or mineral oils have ever been used before for lubricating purposes by any person or persons, and that the compositions of matter herein stated for animal, vegetable, or mineral oils have never been patented to myself or any other person or persons in a foreign country or in the United States.

What I claim, and desire to secure by Letters Patent of the United States, is—

The herein-described compositions of matter to be used for lubricating purposes, consisting of cold water and carbonate of magnesia, nitrate of baryta, refined borax, calcimine, and Epsom salts, in the proportions named for the different oils, and as herein described, increasing or diminishing the proportions of the ingredients for either animal, vegetable, or mineral oils as particular oils may require.

STEPHEN BROADBENT, SR.

Witnesses:
GEORGE H. HOWARD,
H. J. BAILEY.